Figure 1:
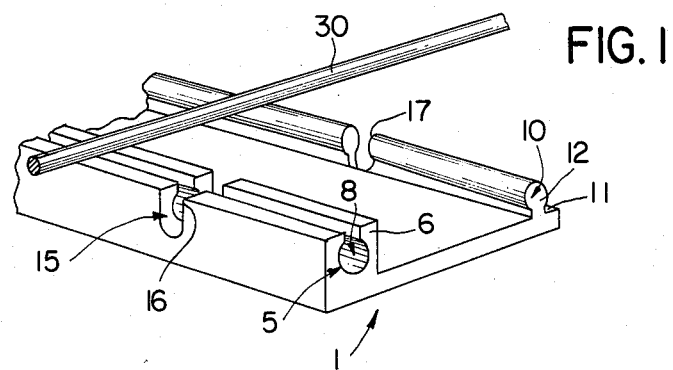

United States Patent [19]

Wier

[11] Patent Number: 4,623,127

[45] Date of Patent: Nov. 18, 1986

[54] SPACER MEMBERS

[76] Inventor: Jan H. Wier, "Burleigh", Bulls, New Zealand

[21] Appl. No.: 657,822

[22] Filed: Oct. 5, 1984

[30] Foreign Application Priority Data

Oct. 8, 1983 [NZ] New Zealand .................. 203823

[51] Int. Cl.⁴ .................................. B25F 27/00
[52] U.S. Cl. ............................ 256/35; 256/34
[58] Field of Search ............... 256/34, 10, 48, 49, 256/50, 52; 403/391, 347, 35

[56] References Cited

U.S. PATENT DOCUMENTS

| 336,889 | 3/1886 | Burns | 256/52 X |
|---|---|---|---|
| 850,773 | 4/1967 | Miner | 256/52 |
| 3,557,413 | 1/1971 | Engle | 24/576 |
| 4,465,263 | 8/1984 | Robbins, Jr. | 256/49 X |
| 4,473,024 | 9/1981 | Armstrong | 24/576 X |

FOREIGN PATENT DOCUMENTS

| 229642 | 10/1963 | Austria | 403/391 |
|---|---|---|---|
| 601283 | 3/1935 | Fed. Rep. of Germany | 403/391 |

Primary Examiner—Andrew V. Kundrat
Attorney, Agent, or Firm—Holman & Stern

[57] ABSTRACT

The invention provides strips of material to provide a spacer member for two adjacent elongate members. In preferred embodiments, one extruded strip is provided which includes a first engaging member extending from side and adjacent to one edge of the strip for at least a part of the length of the strip and a second engaging member extending from the same side of the strip adjacent to the other edge. A plurality of transverse recesses are provided along the strip(s) of material, each recess being adapted to receive and maintain the space apart juxtaposition of the adjacent elongate members. In preferred embodiments, adjacent elongate members are located in the recesses provided in two complementary and interengageable lengths of strip to maintain the spaced apart juxtaposition of the elongate members. The invention has particular application in one preferred embodiment to the providing of spacer members for electrified fence wires. Other possible purposes include locating of and wires for vineyards reinforcing materials or for other structures or purposes.

2 Claims, 3 Drawing Figures

SPACER MEMBERS

This invention relates to spacer members for maintaining the spaced apart relationship of a plurality of longitudinal members.

It has been known to provide a variety of different types of spacer members which are adapted for maintaining longitudinal members in a predetermined spacing throughout their length. These types of spacer members are used in construction industries, and in wires for vineyards, and other uses. However, in one particularly preferred embodiment, spacer members have been widely used to maintain the spacing of fence wires between fence posts, as a more efficient and economical alternative to fence battens. The invention in one preferred embodiment is adapted to provide a spacer member for fence wires, which spacer members are commonly known as "fence droppers".

A variety of different types of greater members of the fence dropper type have been known in the art. However, many of the droppers which have been known in the past have suffered from the disadvantage that they are engaged over adjacent fence wires in a manner such that the wires are then unable to be moved independently of one another without distortion of either the fence dropper or the fence wire. Furthermore, some droppers which have been known in the art have been of complex construction and are difficult to assemble, or alternatively have been incompatible for use with light gauge and/or electrified wires.

It is therefore an object of this invention to provide a spacer member which is adapted to maintain the juxtaposition of adjacent longitudinal members such as fence wires or the like, which is of a simple construction, and yet which is efficient in its use as a spacer member. It is also an object of this invention to provide a spacer member as a fence dropper which is of an efficient design which is readily and cheaply manufactured, and which provides a spacer member being a fence dropper which is in one preferred embodiment particularly adapted for use with electrified fence systems. It is finally an object of this invention to provide the public with a useful choice.

Therefore, according to a first aspect of this invention there is provided a strip of material to provide a spacer member for two adjacent elongate members; said strip including a first engaging member extending from one side and adjacent to one edge of said strip for at least a part of the length of said strip and a second engaging member extending from said one side and adjacent to the other edge of said strip for at least a part of the length of said strip, a plurality of transverse recesses provided along the strip of material said recesses each adapted to receive and maintain the juxtaposed relationship of adjacent elongate members.

In preferred embodiments, the spacer member as described in the preceding paragraph is provided as two lengths of one strip of material wherein the first and second engaging members on one length of material are mutually inter-engageable with corresponding second and first engaging members on another length of material.

In preferred embodiments the spacer member is a strip of a constant cross section continuously extruded in plastics material and is cut to length to provide a spacer member comprised of first and second mutually inter-engageable lengths of said strip material.

In an alternative embodiment the space member is provided as two strips of material wherein the first strip member includes at least one or possibly a pair of engaging members, engageable in and with a complementary engaging member or members provided on said second strip member.

According to a further aspect of this invention there is provided a spacer means for two adjacent elongate members including two strips of plastics material each including at least one engaging member mutually engageable with an engaging member on the other strip and a plurality of transverse recesses adapted to receive an elongate member and said strips being engageable with each other to close about the elongate members and position said spacer on the elongate members and maintain the juxtaposed relationship of said elongate members.

According to further embodiments the strips of plastics material may each include at least one and preferably two engaging members both extending one from one side of and each adjacent to one edge of said strip, with the transverse recesses provided through the protruding portions of said engaging members.

According to a further aspect of this invention there is provided a method of maintaining the juxtaposed relationship of adjacent elongate members including providing two strips of material wherein each strip includes at least one engaging member, engageable with at least one complementary engaging member provided on a second strip member, with a plurality of transverse recesses provided in each strip member, the arrangement being such that adjacent elongate members are able to be positioned in the transverse recesses of complementary strips and the strips engaged each with the other to close about the elongate members and maintain the juxtaposed relationship.

Further according to a preferred embodiment of the invention the wire spacer means is a fence dropper which is extruded in plastics material being ultra-violet treated polythene cut to length.

Figure 2:
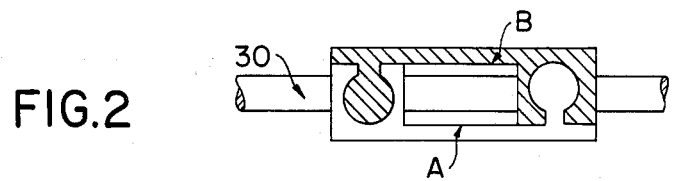
Figure 3:
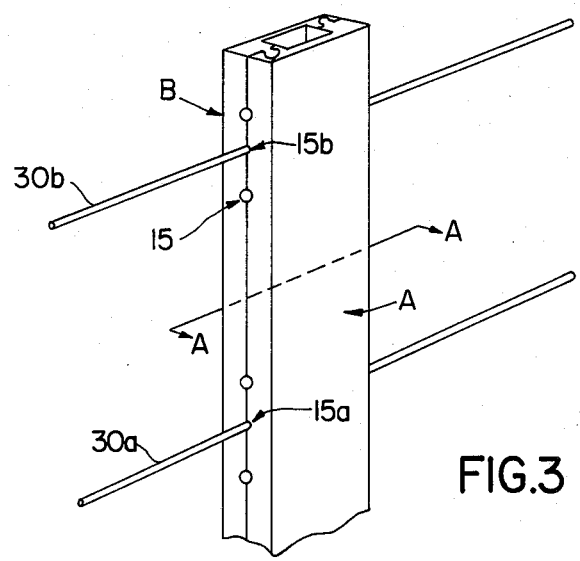

Other objects and advantages of the invention will become apparent from the following description which is given by way of example only and with particular reference to the drawings in which:

FIG. 1 is a diagramatic perspective view of a strip of the material of which the spacer member is comprised in one preferred embodiment of the invention; and FIG. 2 is a diagramatic cross sectional representation of the spacer member along the cross sectional line A—A as shown in FIG. 3 of the drawings; and FIG. 3 is a schematic view of a spacer member of the invention when provided as a fence dropper in one preferred embodiment of the invention:

The invention is comprised of a strip of preferably plastics material which may be of different configurations, but which in preferred embodiments when cut into lengths, provides complementary adjacent sections of the strip that can be interengaged. The strip is provided with a plurality of transverse recesses, each of which is adapted to receive an elongate member such as a fence wire or the like so as to retain adjacent elongate members (fence wires) in a spaced apart relationship.

The following description of the invention will be with reference to preferred embodiments, for a fence wire spacer or "fence dropper" particularly for use with electric fencing systems. It is however to be appreciated that the invention may have a variety of uses in the convenient spacing of elongate members.

As shown in FIG. 1 of the drawings, the invention is preferably provided as an elongate extruded strip which includes a body portion generally indicated by arrow 1. The body portion may be of any shape which will provide both flexibility and some longitudinal rigidity through the length of the extruded strip.

The strip is then provided with a pair of engaging means generally indicated by arrows 5 and 10. The engaging means may be any suitable type of engaging means which will enable adjacent lengths of the strip material to be mutually inter-engaged. In preferred embodiments the engaging members may preferably be provided as a first or female engaging member 5 and a second or male engaging member 10 as shown in the drawings. In particular, the female engaging member is formed integrally with and adjacent one edge of the body of the strip member and is provided as upstanding portion 6, with an opening 7 into a recess 8. The recess 8 is of a shape adapted to receive a corresponding male portion of another length of the strip member.

Similarly, the male portion may be provided on the same face of the strip member as the female member, but adjacent the other edge thereof. The male portion may be provided with an upstanding neck portion 11, and a head 12 which adapted to be engaged in a corresponding recess 8 of another length of the strip member.

In alternative embodiments, two distinctly shaped strip members may be provided. In this embodiment the engaging means would be of any suitable shape so that lengths of the two strip members would be complementary to facilitate interengagement.

The shape of the male and female engaging members shown in the drawings is one possible shape when the invention is to be used as a fence dropper. In particular, male and female fittings of this shape are readily engaged, and may, if required, be disengaged so that the fence dropper can be removed from the fence wires. It is of course to be appreciated that other bayonet or wedge type fittings may be provided so that the fence dropper when assembled is not able to be removed from the wire. Furthermore the dropper may include structural reinforcing ribs along its length (not shown).

The arrangement of the invention then provides for a plurality of transverse recesses generally indicated by arrow 15 to be provided in the strip member. In preferred embodiments, the transverse recesses may be provided as grooves 16 and 17 provided through the respective female and male portions of the strip member, at suitable spacings along the length of the strip member. In manufacture, it is to be appreciated that the strip member would be formed as a continuous length extrusion of a constant cross section, and that the transverse recesses 15 would be cut out of the continuous length of material at predetermined spacings so as to allow for variation in the proposed spacing of the fence wires each from the other.

In one preferred embodiment where the invention is to be used as a fence dropper it is proposed that the recesses would be provided in series recesses of different trameters at predetermined spacings for example the recesses could be 1.6 mm; 2.0 mm and 2.5 mm on a 30 mm repeating spacing. This enables one dropper to be used for a variety of different sizes of wire for a variety of spacings to meet individual fencing requirements.

Now, with reference to FIG. 2 of the drawings, it is to be appreciated that the strip member as described in FIG. 1 may be cut into suitable lengths, and adjacent lengths of the strip member may be fitted one into the other as can be appreciated from the cross section shown in FIG. 2 of the drawings. In particular, a first strip generally indicated by arrow A may be engaged with a second strip generally indicated by arrow B (ahd shown with cross latching). From this cross sectional drawing it will be appreciated that a length of spacer member of the invention including the pair of adjacent inter-engaged strip members has sufficient structural rigidity throughout its length even when manufactured in plastics material to maintain spacing between adjacent fence wires. In preferred embodiments the invention will be manufactured in extruded polythene so as to provide for suitable insulation between the electrified wires of an electric fence system.

However, before the adjacent lengths of strip are engaged, the wires generally indicated by arrows 30a and 30b must be positioned in the tranvserse recesses 15. Once the wires have been positioned in the appropriate recess in one of the strip members, then the other strip member may be placed over the wire and the strip members A and B engaged one with the other to form a spacer member of the invention.

The spacer member or fence dropper is shown in FIG. 3 of the drawings with adjacent wires 30a and 30b being positioned in appropriate recesses 15a and 15b.

The recesses in the preferred embodiment of the invention are of the same diameter as the fence wire or elongate member. Therefore, where the spacer means of the invention is comprised of plastics material, the arrangement provides that the wire is enveloped in the recess. This preferred diameter of the recesses provides that the spacer means when in use grips the wires (or elongate members) to increase the structural rigidity of the spacer members. This was the effect of locking the spacer means in its neutral axis. If additional strength is required it is possible to glue the two strips together if required. However, in both of these embodiments the wire is retained in the spacer means but is still free to be adjusted in tension as required.

Therefore, the spacer member of the invention when used as a fence dropper is generally retained in a perpendicular position relative to the wires and provides a fence dropper which envelopes the wires, and is retained thereon, but which enables individual wires to be tensioned in the normal manner independently of adjacent wires, without distorting the location of the spacer member. Furthermore, the invention provides a spacer member which is of simple design and construction, which may be readily produced in cheap plastics material, and which provides an efficient spacer member for maintaining the spaced apart relationship of adjacent elongate members such as fence wires and the like.

Finally, it will be appreciated that the invention has been described by way of example only, and that modifications, alterations and additions may be made to the invention without departing from the scope thereof.

I claim:

1. A spacer member for maintaining the structurally juxtaposed relationship of adjacent wires of a fence including two lengths of a strip member which is relatively rigid throughout its longitudinal axis, each length of strip member including on one flat side thereof a first engaging male member and a second laterally spaced complementary engaging female member protruding from said one side of and adjacent respective edges of said strip member and lying in a common plane, and said strip member including a plurality of transversely extending aligned recesses provided in said protruding engaging members, the two lengths of said strip member being mutually self engageable for enclosing adjacent wires of a fence in adjacent complementary recesses in the lengths of strip member to provide a spacer member which maintains the juxtaposed relationship of at least two adjacent wires of a fence.

2. A method of maintaining the juxtaposed relationship of adjacent wires in a fence including providing two lengths of a strip member, each length of strip member includes on one flat side a first engaging male member and a second laterally spaced complementary engaging female member protruding from said one side and adjacent respective edges of said strip member and lying in a common plane, with a plurality of transversely extending aligned recesses provided in said protruding engaging members, the arrangement being such that the adjacent wires of a fence are positioned in the transverse recesses in two lengths of the strip member and the lengths of strip member self engaged each with the other to close about the adjacent wires of a fence and maintain the juxtaposed relationship of said wires.

* * * * *